US012508085B2

(12) United States Patent
Shoham et al.

(10) Patent No.: US 12,508,085 B2
(45) Date of Patent: Dec. 30, 2025

(54) SYSTEMS, METHODS, AND DEVICES FOR VERIFYING MECHANICAL COUPLING BETWEEN ANATOMICAL ELEMENTS

(71) Applicant: Mazor Robotics Ltd., Caesarea (IL)

(72) Inventors: Moshe Shoham, Hoshaya (IL); Avi Turgeman, Beer Yaakov (IL); Yizhaq Shmayahu, Ramat HaSharon (IL)

(73) Assignee: Mazor Robotics Ltd., Caesarea (IL)

( * ) Notice: Subject to any disclaimer, the term of this patent is extended or adjusted under 35 U.S.C. 154(b) by 816 days.

(21) Appl. No.: 17/583,788

(22) Filed: Jan. 25, 2022

(65) Prior Publication Data

US 2022/0241026 A1    Aug. 4, 2022

Related U.S. Application Data

(60) Provisional application No. 63/145,659, filed on Feb. 4, 2021.

(51) Int. Cl.
*A61B 34/00* (2016.01)
*A61B 5/00* (2006.01)
(Continued)

(52) U.S. Cl.
CPC .......... *A61B 34/25* (2016.02); *A61B 5/0051* (2013.01); *A61B 5/103* (2013.01); *A61B 5/1075* (2013.01);
(Continued)

(58) Field of Classification Search
CPC ....... A61B 34/25; A61B 5/0051; A61B 5/103; A61B 5/1075; A61B 8/08;
(Continued)

(56) References Cited

U.S. PATENT DOCUMENTS 5,329,933 A    7/1994  Graf
6,152,890 A   11/2000  Kupfer et al.
(Continued)

FOREIGN PATENT DOCUMENTS

CA    2958013    4/2017
CN   108186120   6/2018
(Continued)

OTHER PUBLICATIONS

Aranda-Valera et al. "Measuring Spinal Mobility Using an Inertial Measurement Unit System: A Validation Study in Axial Spondyloarthritis," Diagnostics, 2020, vol. 10, No. 6, Article 426, 13 pages.
(Continued)

*Primary Examiner* — Abid A Mustansir
(74) *Attorney, Agent, or Firm* — Sheridan Ross P.C.

(57) ABSTRACT

A device comprises at least one processor and a memory comprising instructions that when executed by the at least one processor cause the at least one processor to: generate a first signal that causes a vibration device to vibrate, the vibration device being in force-transmitting contact with a first anatomical element; receive, from a sensor, a second signal based on sensed vibration in a second anatomical element proximate the first anatomical element; and determine, based on the second signal, an amount of mechanical coupling between the second anatomical element and the first anatomical element.

20 Claims, 4 Drawing Sheets

(51) Int. Cl.
  *A61B 5/103*   (2006.01)
  *A61B 5/107*   (2006.01)
  *A61B 8/08*    (2006.01)
  *A61B 17/00*   (2006.01)
  *A61B 17/11*   (2006.01)
  *A61B 34/20*   (2016.01)
  *A61B 34/30*   (2016.01)
  *A61H 1/00*    (2006.01)
  *A61H 23/00*   (2006.01)

(52) U.S. Cl.
  CPC .......... *A61B 8/08* (2013.01); *A61B 17/00234* (2013.01); *A61B 17/1128* (2013.01); *A61B 34/20* (2016.02); *A61B 34/30* (2016.02); *A61H 1/001* (2013.01); *A61H 23/00* (2013.01); *A61B 2017/00238* (2013.01); *A61B 2017/00477* (2013.01); *A61H 2201/5061* (2013.01)

(58) Field of Classification Search
  CPC .......... A61B 17/00234; A61B 17/1128; A61B 34/20; A61B 34/30; A61B 2017/00238; A61B 2017/00477; A61B 2034/2048; A61B 2034/2055; A61B 2090/374; A61B 2090/376; A61B 2090/3762; A61B 2090/378; A61B 2090/3937; A61B 2505/05; A61B 90/361; A61B 90/37; A61B 2562/0219; A61B 2017/00022; A61H 1/001; A61H 23/00; A61H 2201/5061
  See application file for complete search history.

(56) References Cited

U.S. PATENT DOCUMENTS

| | | | |
|---|---|---|---|
| 6,200,024 B1 | 3/2001 | Negralli | |
| 6,435,715 B1 | 8/2002 | Betz et al. | |
| 6,582,121 B2 | 6/2003 | Crain et al. | |
| 6,644,852 B2 | 11/2003 | Crain et al. | |
| 7,198,630 B2 | 4/2007 | Lipow | |
| 7,567,834 B2 | 7/2009 | Clayton et al. | |
| 7,708,741 B1 | 5/2010 | Bonutti | |
| 7,899,226 B2 | 3/2011 | Pescatore et al. | |
| 7,907,166 B2 | 3/2011 | Lamprecht et al. | |
| 8,073,528 B2 | 12/2011 | Zhao et al. | |
| 8,108,072 B2 | 1/2012 | Zhao et al. | |
| 8,147,503 B2 | 4/2012 | Zhao et al. | |
| 8,392,022 B2 | 3/2013 | Ortmaier et al. | |
| 8,568,317 B1 | 10/2013 | Gharib et al. | |
| 8,611,495 B2 | 12/2013 | Maschke | |
| 8,721,566 B2 | 5/2014 | Connor et al. | |
| 8,781,630 B2 | 7/2014 | Banks et al. | |
| 8,870,889 B2 | 10/2014 | Frey | |
| 9,050,728 B2 | 6/2015 | Ban et al. | |
| 9,259,276 B2 | 2/2016 | Mintz et al. | |
| 9,259,278 B2 | 2/2016 | Jensen | |
| 9,259,282 B2 | 2/2016 | Azizian et al. | |
| 9,307,894 B2 | 4/2016 | von Grunberg et al. | |
| 9,402,689 B2 | 8/2016 | Prisco et al. | |
| 9,492,927 B2 | 11/2016 | Diolaiti et al. | |
| 9,592,096 B2 | 3/2017 | Maillet et al. | |
| 9,649,072 B2 | 5/2017 | Ragnarsdottir et al. | |
| 9,662,174 B2 | 5/2017 | Taylor et al. | |
| 9,687,301 B2 | 6/2017 | Lee et al. | |
| 9,767,608 B2 | 9/2017 | Lee et al. | |
| 9,789,313 B2 | 10/2017 | Lipani | |
| 9,888,966 B2 | 2/2018 | Farritor et al. | |
| 9,895,813 B2 | 2/2018 | Blumenkranz et al. | |
| 9,969,090 B2 | 5/2018 | Warashina et al. | |
| 10,076,385 B2 | 9/2018 | Shoham et al. | |
| 10,149,729 B2 | 12/2018 | Smaby et al. | |
| 10,271,832 B2 | 4/2019 | O'Neil et al. | |
| 10,299,880 B2 | 5/2019 | Ramirez Luna et al. | |
| 10,368,054 B2 | 7/2019 | Panescu et al. | |
| 10,383,765 B2 | 8/2019 | Alvarez et al. | |
| 10,390,895 B2 | 8/2019 | Henderson et al. | |
| 10,456,076 B2 | 10/2019 | Liu | |
| 10,456,211 B2 | 10/2019 | McAfee | |
| 10,512,413 B2 | 12/2019 | Schepis et al. | |
| 10,561,384 B2 | 2/2020 | Tanaka et al. | |
| 10,668,625 B2 | 6/2020 | Kuroda et al. | |
| 10,675,098 B2 | 6/2020 | Zhao et al. | |
| 10,675,107 B2 | 6/2020 | Steger et al. | |
| 10,812,778 B1 | 10/2020 | Wang et al. | |
| 11,298,195 B2 | 4/2022 | Ye et al. | |
| 2004/0122427 A1 | 6/2004 | Holmes | |
| 2005/0096502 A1 | 5/2005 | Khalili | |
| 2006/0241414 A1 | 10/2006 | Nowlin et al. | |
| 2006/0258938 A1 | 11/2006 | Hoffman et al. | |
| 2007/0001638 A1* | 1/2007 | Gray ..................... B25J 9/1692 318/568.11 |
| 2007/0106307 A1 | 5/2007 | Bodduluri et al. | |
| 2007/0232958 A1 | 10/2007 | Donofrio et al. | |
| 2011/0069818 A1 | 3/2011 | Muller | |
| 2011/0087238 A1 | 4/2011 | Wang et al. | |
| 2011/0106102 A1 | 5/2011 | Balicki et al. | |
| 2011/0172566 A1 | 7/2011 | Kawchuk | |
| 2011/0172720 A1 | 7/2011 | Metcalf, Jr. et al. | |
| 2012/0029694 A1 | 2/2012 | Mueller | |
| 2012/0041562 A1 | 2/2012 | Shachar et al. | |
| 2013/0012831 A1 | 1/2013 | Schmitz et al. | |
| 2013/0096574 A1 | 4/2013 | Kang et al. | |
| 2013/0268007 A1 | 10/2013 | Rezach et al. | |
| 2014/0163736 A1 | 6/2014 | Azizian et al. | |
| 2014/0179997 A1 | 6/2014 | von Grunberg et al. | |
| 2014/0188132 A1 | 7/2014 | Kang | |
| 2014/0253684 A1 | 9/2014 | Kumar et al. | |
| 2014/0309659 A1 | 10/2014 | Roh et al. | |
| 2015/0297177 A1 | 10/2015 | Boctor et al. | |
| 2016/0081754 A1 | 3/2016 | Kostrzewski et al. | |
| 2016/0184032 A1 | 6/2016 | Romo et al. | |
| 2017/0273614 A1 | 9/2017 | Giphart et al. | |
| 2018/0064497 A1 | 3/2018 | Hussain et al. | |
| 2018/0193101 A1 | 7/2018 | Hashimoto | |
| 2018/0263530 A1 | 9/2018 | Jung | |
| 2018/0307314 A1 | 10/2018 | Connor | |
| 2018/0333061 A1 | 11/2018 | Pracyk et al. | |
| 2018/0368931 A1 | 12/2018 | Hongo et al. | |
| 2019/0069957 A1 | 3/2019 | Barral et al. | |
| 2019/0125460 A1 | 5/2019 | Maillet et al. | |
| 2019/0206565 A1 | 7/2019 | Shelton, IV | |
| 2019/0307519 A1 | 10/2019 | Popovic | |
| 2019/0357884 A1 | 11/2019 | Williams et al. | |
| 2019/0374299 A1 | 12/2019 | Peine | |
| 2020/0015806 A1 | 1/2020 | Scheib et al. | |
| 2020/0015923 A1 | 1/2020 | Scheib et al. | |
| 2020/0054215 A1 | 2/2020 | Roche | |
| 2020/0060775 A1 | 2/2020 | Bonutti | |
| 2020/0069377 A1 | 3/2020 | Finley et al. | |
| 2020/0113637 A1 | 4/2020 | Ida et al. | |
| 2020/0169673 A1 | 5/2020 | King et al. | |
| 2020/0179065 A1 | 6/2020 | Crawford et al. | |
| 2020/0205900 A1 | 7/2020 | Buckland et al. | |
| 2020/0261160 A1 | 8/2020 | Peine et al. | |
| 2020/0261297 A1 | 8/2020 | Strydom et al. | |
| 2020/0360099 A1 | 11/2020 | Smaby et al. | |
| 2020/0405403 A1 | 12/2020 | Shelton, IV et al. | |
| 2021/0029307 A1 | 1/2021 | King et al. | |
| 2021/0219997 A1* | 7/2021 | Tyndall ................. A61B 90/06 |
| 2021/0298590 A1 | 9/2021 | Ayvali et al. | |
| 2021/0338348 A1 | 11/2021 | Zahavi et al. | |
| 2021/0402603 A1 | 12/2021 | Murphy et al. | |
| 2022/0096188 A1 | 3/2022 | Ellman et al. | |
| 2022/0160445 A1 | 5/2022 | Meglan et al. | |
| 2022/0241032 A1 | 8/2022 | Zucker et al. | |
| 2022/0395342 A1 | 12/2022 | Weiss et al. | |

FOREIGN PATENT DOCUMENTS

| | | |
|---|---|---|
| CN | 109171745 | 1/2019 |
| DE | 10042599 | 3/2002 |

(56) References Cited

FOREIGN PATENT DOCUMENTS

| | | |
|---|---|---|
| DE | 102012004506 | 9/2013 |
| DE | 102015217059 | 3/2017 |
| EP | 2289452 | 3/2011 |
| EP | 2757948 | 7/2014 |
| EP | 2467074 | 1/2019 |
| EP | 3492046 | 6/2019 |
| EP | 3492047 | 6/2019 |
| EP | 2739231 | 9/2019 |
| EP | 3551983 | 10/2019 |
| EP | 3060157 | 12/2019 |
| EP | 3609422 | 2/2020 |
| EP | 2879608 | 3/2020 |
| GB | 2156983 | 10/1985 |
| JP | 5207490 | 6/2013 |
| JP | 2017-512299 | 5/2017 |
| JP | 2019-524230 | 9/2019 |
| KR | 10-2019-114052 | 10/2019 |
| RO | 132416 | 3/2018 |
| WO | WO 95/01757 | 1/1995 |
| WO | WO 96/29930 | 10/1996 |
| WO | WO 00/35366 | 6/2000 |
| WO | WO 2007/025218 | 3/2007 |
| WO | WO 2007/038510 | 4/2007 |
| WO | WO 2010/068005 | 6/2010 |
| WO | WO 2011/149845 | 12/2011 |
| WO | WO 2012/168534 | 12/2012 |
| WO | WO 2014/106262 | 7/2014 |
| WO | WO 2018/203903 | 11/2018 |
| WO | WO 2019/036006 | 2/2019 |
| WO | WO 2019/206340 | 10/2019 |
| WO | WO 2020/072255 | 4/2020 |
| WO | WO 2020/079596 | 4/2020 |
| WO | WO 2020/118244 | 6/2020 |
| WO | WO 2020/201353 | 10/2020 |

OTHER PUBLICATIONS

Leroy "Analysis of the spine through a multibody model and IMU technology," Ecole polytechnique de Louvain, Université catholique de Louvain, 2019, 90 pages [retrieved online Oct. 29, 2020 from: hdl.handle.net/2078.1/thesis:19491].
Voinea et al. "Measurement and Geometric Modelling of Human Spine Posture for Medical Rehabilitation Purposes Using a Wearable Monitoring System Based on Inertial Sensors," Sensors, 2017, vol. 17, No. 1, Article 3, 19 pages.
"Robotic Assisted Systems," Intuitive Surgical, Jul. 2019, 5 pages.
"Robot-Assisted Laparoscopic Procedures," EBESCO Information Services, Updated May 2014, 6 pages [retrieved online from: www.wkhs.com/cancer/cancer-treatment-services/surgery/robotic-surgery/robot-assisted-laparoscopic-procedures].
Abdelaal et al. "A multi-camera, multi-view system for training and skill assessment for robot-assisted surgery," International Journal of Computer Assisted Radiology and Surgery, May 2020, vol. 15, pp. 1369-1377.
Boctor et al. "A Dual-Armed Robotic System for Intraoperative Ultrasound Guided Hepatic Ablative Therapy: A Prospective Study," IEEE, Proceedings of the 2004 IEEE International Conference on Robotics & Automation, New Orleans, LA, Apr. 2004, pp. 2517-2522.
Cao et al. "A Novel Robotic Suturing System for Flexible Endoscopic Surgery," IEEE, 2019 International Conference on Robotics and Automation (ICRA), May 20-24, 2019, Montreal, Canada, 7 pages.
Haratian et al. "Toward Flexibility in Sensor Placement for Motion Capture Systems: A Signal Processing Approach," IEEE Sensors Journal, Mar. 2014, vol. 14, No. 3, pp. 701-709.
He et al. "A Multi-Function Force Sensing Instrument for Variable Admittance Robot Control in Retinal Microsurgery," 2014 IEEE International Conference on Robotics and Automation (ICRA), 2014, pp. 1411-1418.

Hennersperger et al. "Towards MRI-Based Autonomous Robotic US Acquisitions: A First Feasibility Study," IEEE Transactions on Medical Imaging, Feb. 2017, vol. 36, No. 2, pp. 538-548.
Joskowicz "Computer-aided surgery meets predictive, preventive, and personalized medicine," EPMA Journal, 2017, vol. 8, 4 pages.
Khandalavala "Emerging surgical robotic technology: a progression toward microbots," Annals of Laparoscopic and Endoscopic Surgery, Jan. 2020, vol. 5, Article 3, 18 pages.
Kim et al. "Robot-Assisted Cardiac Surgery Using the Da Vinci Surgical System: A Single Center Experience," Korean Journal of Thoracic and Cardiovascular Surgery, 2015, vol. 48, pp. 99-104.
Kong et al. "Da Vinci Tool Torque Mapping over 50,000 Grasps and its Implications on Grip Force Estimation Accuracy," 2018 International Symposium on Medical Robotics (ISMR), 2018, 6 pages.
Kumar et al. "Emerging role of robotics in urology, Journal of Minimal Access Surgery," Oct. 2005, vol. 1, No. 4, pp. 202-210.
Li et al. "Design of a Multi-Arm Surgical Robotic System for Dexterous Manipulation," Journal of Mechanisms and Robotics, Dec. 2016, vol. 8, article 061017, 10 pages.
Matthews "How better data, 5G, and surgical robots will improve healthcare," The Robot Report, Sep. 29, 2019, 12 pages [retrieved online from: www.therobotreport.com/better-data-advancing-healthcare-robotics].
Seibold "An Advanced Force Feedback Tool Design for Minimally Invasive Robotic Surgery," Technische Universität München, May 15, 2012, Doctoral Engineers dissertation, 218 pages.
Staub "Micro Endoscope based Fine Manipulation in Robotic Surgery," Technische Universitat Munchen Lehrstuhl Robotic und Echtzeitsysteme, Dissertation, Apr. 2013, 146 pages.
Stolka et al. "Improving Navication Precision of Milling Operations in Surgical Robotics," Proceedings of the 2006 IEEE/RSJ International Conference on Intelligent Robotics and Systems, Oct. 9-15, 2008, Beijing, China, pp. 2351-2357.
Tian et al. "A Robot-Assisted Surgical System Using a Force-Image Control Method for Pedicle Screw Insertion," PLOS One, Jan. 2014, vol. 9, No. 1, article e86346, 9 pages.
Valeo "Scarless Surgery: The benefits and drawbacks of robotic thryroidectomy," ENTtoday, Apr. 1, 2010, 4 pages [retrieved online from: www.enttoday.org/article/scarless-surgery-the-benefits-and-drawbacks-of-robotic-thryroidectomy/].
Vandini et al. "Unified Tracking and Shape Estimation for Concentric Tube Robots," IEEE Transactions on Robotics, Aug. 2017, vol. 33, No. 4, pp. 901-915.
Vivek et al. "Study of Neuroarm and Force Sensing Grippers in Robo-Assisted Neurosurgery," International Journal of Current Engineering and Technology, Mar. 2016, Special Issue 4, pp. 444-447.
International Search Report and Written Opinion for International (PCT) Patent Application No. PCT/IB2021/058420, dated Nov. 29, 2021 16 pages.
International Preliminary Report on Patentability for International (PCT) Patent Application No. PCT/IB2021/058420, dated Apr. 13, 2023 10 pages.
Invitation to Pay Additional Fees for International (PCT) Patent Application No. PCT/IL2022/050126, dated May 27, 2022, 11 pages.
International Search Report and Written Opinion for International (PCT) Patent Application No. PCT/IL2022/050126, dated Jul. 18, 2022, 18 pages.
Invitation to Pay Additional Fees for International (PCT) Patent Application No. PCT/IL2022/050603, dated Oct. 6, 2022, 13 pages.
International Search Report and Written Opinion for International (PCT) Patent Application No. PCT/IL2022/050603, dated Nov. 28, 2022, 21 pages.
International Search Report and Written Opinion prepared by the Israel Patent Office on Dec. 31, 2019, for International Application No. PCT/IB2019/058795.
Official Action with Machine Translation for China Patent Application No. 201980067844.9, dated Mar. 1, 2024, 27 pages.
Extended Search Report for European Patent Application No. 19872498.1, dated Jun. 9, 2022, 9 pages.
Official Action with English Translation for Japan Patent Application No. 2021-514567, dated May 11, 2023, 12 pages.

(56) References Cited

OTHER PUBLICATIONS

Official Action with English Translation for Japan Patent Application No. 2021-514567, dated Sep. 26, 2023, 12 pages.
Official Action for U.S. Appl. No. 17/464,300, dated Aug. 20, 2024 31 pages.
Official Action for U.S. Appl. No. 17/575,404, dated Jun. 21, 2024 13 pages.
Official Action for U.S. Appl. No. 17/344,658, dated Aug. 4, 2023 6 pages Restriction Requirement.
Official Action for U.S. Appl. No. 17/344,658, dated Oct. 25, 2023 9 pages.
Official Action for U.S. Appl. No. 17/344,658, dated Mar. 21, 2024 12 pages.
Official Action for U.S. Appl. No. 17/344,658, dated Jul. 15, 2024 10 pages.
Official Action for U.S. Appl. No. 17/285,374, dated Aug. 30, 2023 14 pages.
Official Action for U.S. Appl. No. 17/285,374, dated Feb. 6, 2024 16 pages.
Official Action for U.S. Appl. No. 17/285,374, dated May 8, 2024 15 pages.
Dai et al. "Vibration-Based Milling Condition Monitoring in Robot-Assisted Spine Surgery," IEEE/AMSE Transactions on Mechatronics, Dec. 2015, vol. 20, No. 6, pp. 3028-3039.
International Search Report and Written Opinion for International (PCT) Patent Application No. PCT/IL2022/050141, dated Jun. 8, 2022, 16 pages.
Li et al. "Robotic Systems for MIR-Guided Stereotactic Neurosurgery," IEEE Transactions on Biomedical Engineering, Apr. 2015, vol. 62, No. 4, pp. 1077-1088.
Official Action with English Translation for Japan Patent Application No. 2024-009920, dated Jan. 15, 2025, 6 pages.
Notice of Allowance for U.S. Appl. No. 17/464,300, dated Nov. 20, 2024 10 pages.
Official Action for U.S. Appl. No. 17/575,404, dated Oct. 25, 2024 20 pages.
Official Action for U.S. Appl. No. 17/575,404, dated Feb. 21, 2025 19 pages.
Official Action for U.S. Appl. No. 17/344,658, dated Dec. 16, 2024 15 pages.
Notice of Allowance for U.S. Appl. No. 17/285,374, dated Oct. 30, 2024 8 pages.

* cited by examiner

SYSTEMS, METHODS, AND DEVICES FOR VERIFYING MECHANICAL COUPLING BETWEEN ANATOMICAL ELEMENTS

CROSS REFERENCE TO RELATED APPLICATIONS

This application claims the benefit of U.S. Provisional Application No. 63/145,659, filed on Feb. 4, 2021, and entitled "Systems, Methods, and Devices for Verifying Mechanical Coupling between Anatomical Elements," which application is incorporated herein by reference in its entirety.

FIELD

The present technology generally relates to systems, methods, and devices for verifying mechanical coupling between anatomical elements, and relates more particularly to verification of mechanical coupling between anatomical elements using inertial measurement units (IMUs).

BACKGROUND

Surgical robots may assist a surgeon or other medical provider in carrying out a surgical procedure or may complete one or more surgical procedures autonomously. Post-operation, it may be desired to verify the success of the surgical procedure.

SUMMARY

Example aspects of the present disclosure include:

A device according to at least one embodiment of the present disclosure comprises at least one processor; and a memory comprising instructions that when executed by the at least one processor cause the at least one processor to: generate a first signal that causes a vibration device to vibrate, the vibration device being in force-transmitting contact with a first anatomical element; receive, from a sensor, a second signal based on sensed vibration in a second anatomical element proximate the first anatomical element; and determine, based on the second signal, an amount of mechanical coupling between the second anatomical element and the first anatomical element.

Any of the aspects herein, wherein the first signal causes the vibration device to vibrate at a first amplitude, and wherein the second signal is generated at a second amplitude by vibration of the second anatomical element.

Any of the aspects herein, wherein the at least one processor determines the amount of mechanical coupling by: determining a difference between the first amplitude and the second amplitude; and determining the amount of mechanical coupling based on the difference. Additionally or alternatively, the amount of mechanical coupling may be determined based on a difference between a frequency of a signal induced to the first anatomical element (which may be the same as or different from the frequency of the first signal) of the vibration device and a frequency of a signal sensed at the second anatomical element. Still further, the amount of mechanical coupling may be additionally or alternatively determined based on a difference between a phase of the signal induced to the first anatomical element and a phase of the signal sensed at the second anatomical element.

Any of the aspects herein, wherein the instructions include instructions that cause the at least one processor to: compare the difference to a plurality of threshold differences; and determine the amount of mechanical coupling based on the comparison of the difference to the plurality of threshold differences, each threshold difference being associated with a different amount of mechanical coupling between the first anatomical element and the second anatomical element; and output an indication of the amount of mechanical coupling to a user interface.

Any of the aspects herein, wherein the instructions include instructions that cause the at least one processor to determine that the second anatomical element is mechanically coupled to the first anatomical element and output a first indication to the user interface that the second anatomical element is mechanically coupled to the first anatomical element when the amount of mechanical coupling is at or above a threshold amount; and determine that the second anatomical element is not mechanically coupled to the first anatomical element and output a second indication to the user interface that the second anatomical element is not mechanically coupled to the first anatomical element when the amount of mechanical coupling is below the threshold amount.

Any of the aspects herein, wherein the instructions include instructions that cause the at least one processor to determine at least one attribute of the mechanical coupling between the first anatomical element and the second anatomical element.

Any of the aspects herein, wherein the at least one attribute of the mechanical coupling identifies at least one type of connecting anatomical tissue type that forms the mechanical coupling.

Any of the aspects herein, wherein the instructions include instructions that cause the at least one processor to determine the at least one type of connecting anatomical tissue based on the first signal and the second signal.

Any of the aspects herein, wherein the first signal has a first frequency and the second signal has a second frequency, and wherein the instructions include instructions that cause the at least one processor to: generate a third signal that causes the vibration device to vibrate the first anatomical element at a third frequency with a third amplitude, the third frequency being different than the first frequency; receive, from the sensor, a fourth signal at a fourth frequency with a fourth amplitude based on sensed vibration of the second anatomical element caused by the vibration of the first anatomical element at the third frequency; and determine the at least one type of connecting anatomical tissue based on the first signal, the second signal, the third signal, and the fourth signal.

Any of the aspects herein, wherein the at least one processor: determines a first type of the at least one type of connecting anatomical tissue based on the first signal and the second signal; and determines a second type of the at least one type of connecting anatomical tissue different than the first type based on the third signal and the fourth signal.

Any of the aspects herein, wherein the at least one type of connecting anatomical tissue includes one or more of soft tissue, hard tissue, scar tissue, fluid, muscle, or bone.

Any of the aspects herein, wherein the instructions include instructions that cause the at least one processor to generate at least one control signal for a robot based on the determination that the second anatomical element is either mechanically coupled to or not mechanically coupled to the first anatomical element.

A system according to aspects of the present disclosure comprises: a vibration device configured to provide vibration; a sensor configured to sense vibration; at least one processor; and a memory comprising instructions that when executed by the at least one processor cause the at least one processor to: generate a first signal that causes the vibration device to vibrate, the vibration device being in force-transmitting contact with a first anatomical element; receive, from the sensor, a second signal based on sensed vibration in a second anatomical element proximate the first anatomical element; and determine, based on the second signal, an amount of mechanical coupling between the second anatomical element and the first anatomical element.

Any of the aspects herein, wherein the vibration device is configured to be mechanically connected to the first anatomical element.

Any of the aspects herein, wherein the sensor is configured to be mechanically connected to the second anatomical element.

Any of the aspects herein, wherein one of the first anatomical element or the second anatomical element includes bone, and wherein the other one of the first anatomical element or the second anatomical element includes a nerve.

Any of the aspects herein, wherein the bone includes bone of a vertebra and the nerve includes a spinal nerve.

Any of the aspects herein, wherein the first anatomical element and the second anatomical element include parts of a spine, and wherein the at least one processor determines an amount of spinal decompression based on the amount of the mechanical coupling.

Any of the aspects herein, further comprising: at least one robot configured to alter the amount of mechanical coupling to bring the amount of spinal decompression closer to a target amount.

A method according to an aspect of the present disclosure comprises: generating a first signal that causes a vibration device to vibrate, the vibration device being in force-transmitting contact with a first anatomical element; receiving, from a sensor, a second signal based on sensed vibration of a second anatomical element proximate the first anatomical element; determining an amount of mechanical coupling between the first anatomical element and the second anatomical element based on the second signal; and controlling a robot to alter the amount of the mechanical coupling based on to a target amount of mechanical coupling between the first anatomical element and the second anatomical element.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

It is to be appreciated that any feature described herein can be claimed in combination with any other feature(s) as described herein, regardless of whether the features come from the same described embodiment.

The details of one or more aspects of the disclosure are set forth in the accompanying drawings and the description below. Other features, objects, and advantages of the techniques described in this disclosure will be apparent from the description and drawings, and from the claims.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. When each one of A, B, and C in the above expressions refers to an element, such as X, Y, and Z, or class of elements, such as $X_1$-$X_n$, $Y_1$-$Y_m$, and $Z_1$-$Z_o$, the phrase is intended to refer to a single element selected from X, Y, and Z, a combination of elements selected from the same class (e.g., $X_1$ and $X_2$) as well as a combination of elements selected from two or more classes (e.g., $Y_1$ and $Z_o$).

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The preceding is a simplified summary of the disclosure to provide an understanding of some aspects of the disclosure. This summary is neither an extensive nor exhaustive overview of the disclosure and its various aspects, embodiments, and configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and configurations of the disclosure are possible utilizing, alone or in combination, one or more of the features set forth above or described in detail below.

Numerous additional features and advantages of the present invention will become apparent to those skilled in the art upon consideration of the embodiment descriptions provided hereinbelow.

BRIEF DESCRIPTION OF THE DRAWINGS

The accompanying drawings are incorporated into and form a part of the specification to illustrate several examples of the present disclosure. These drawings, together with the description, explain the principles of the disclosure. The drawings simply illustrate preferred and alternative examples of how the disclosure can be made and used and are not to be construed as limiting the disclosure to only the illustrated and described examples. Further features and advantages will become apparent from the following, more detailed, description of the various aspects, embodiments, and configurations of the disclosure, as illustrated by the drawings referenced below.

DETAILED DESCRIPTION

It should be understood that various aspects disclosed herein may be combined in different combinations than the combinations specifically presented in the description and accompanying drawings. It should also be understood that, depending on the example or embodiment, certain acts or events of any of the processes or methods described herein may be performed in a different sequence, and/or may be added, merged, or left out altogether (e.g., all described acts or events may not be necessary to carry out the disclosed techniques according to different embodiments of the present disclosure). In addition, while certain aspects of this disclosure are described as being performed by a single module or unit for purposes of clarity, it should be understood that the techniques of this disclosure may be performed by a combination of units or modules associated with, for example, a computing device and/or a medical device.

In one or more examples, the described methods, processes, and techniques may be implemented in hardware, software, firmware, or any combination thereof. If implemented in software, the functions may be stored as one or more instructions or code on a computer-readable medium and executed by a hardware-based processing unit. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital signal processors (DSPs), general purpose microprocessors (e.g., Intel Core i3, i5, i7, or i9 processors; Intel Celeron processors; Intel Xeon processors; Intel Pentium processors; AMD Ryzen processors; AMD Athlon processors; AMD Phenom processors; Apple A10 or 10X Fusion processors; Apple A11, A12, A12X, A12Z, or A13 Bionic processors; or any other general purpose microprocessors), graphics processing units (e.g., Nvidia GeForce RTX 2000-series processors, Nvidia GeForce RTX 3000-series processors, AMD Radeon RX 5000-series processors, AMD Radeon RX 6000-series processors, or any other graphics processing units), application specific integrated circuits (ASICs), field programmable logic arrays (FPGAs), or other equivalent integrated or discrete logic circuitry. Accordingly, the term "processor" as used herein may refer to any of the foregoing structure or any other physical structure suitable for implementation of the described techniques. Also, the techniques could be fully implemented in one or more circuits or logic elements.

Before any embodiments of the disclosure are explained in detail, it is to be understood that the disclosure is not limited in its application to the details of construction and the arrangement of components set forth in the following description or illustrated in the drawings. The disclosure is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, the present disclosure may use examples to illustrate one or more aspects thereof. Unless explicitly stated otherwise, the use or listing of one or more examples (which may be denoted by "for example," "by way of example," "e.g.," "such as," or similar language) is not intended to and does not limit the scope of the present disclosure.

After completion of surgical decompression for spinal foraminal stenosis, verification that the nerve is free is often performed to identify adhesions and/or to verify adequate decompression of the spine. Related art solutions use tactile feedback over a manually held probe to feel whether the nerve is loose, which may lack reliability and speed given manual manipulation of the probe. Manual manipulation of the probe also introduces the risk of damaging the anatomy during verification. According to some embodiments of the present disclosure, quantitative assessment of such verification may be provided, for example, using robots. At least one example embodiment provides two elements: one element providing mechanical vibrations on a first anatomical element, and a second element sensing the mechanical vibrations from a second anatomical element. For example, a clamp may be attached to the nerve that causes or receives vibration to cause the nerve to vibrate, and an inertial measurement unit (IMU) may be attached to a vertebra that senses vibration. The output of the IMU or other vibration sensor is used to assess the level of mechanical attachment between the two anatomic elements. The same or similar mechanism may be used to evaluate additional use cases of attachments of bone and neural elements (e.g., dural adhesions). Another use case relates to checking whether two vertebrae are fused or otherwise connected. The presence of a mechanical coupling between any two anatomical elements may be detected in like manner.

In addition, the phases and the amplitudes of vibration applied to one anatomical element and sensed on another anatomical element may inform a determination of the types of tissue in the vicinity of the two anatomical elements. For example, different frequencies are transformed in different manners by different types of tissue. Thus, even if two anatomical elements are not tightly coupled, if there is some coupling through scar tissue, example embodiments may identify that such scar tissue exists. For example, a dural sac and a ligamentum flavum are sometimes attached by scar tissue, which is not a tight mechanical coupling, but not free either. Such scar tissue, and a degree of mechanical coupling resulting therefrom, may be detected using embodiments of the present disclosure. Similarly, if there is fluid, then embodiments of the present disclosure may be used to identify the fluid.

In any event, a robot may be employed to alter the mechanical coupling between two anatomical elements or take other action depending on the measured mechanical coupling. In the spinal decompression example, the robot may function to release attachment of the nerve from a vertebra to achieve separation between the two. For example, if there is an entrapped nerve, the robot may release the nerve by cutting entrapping tissue. If there are adhesions, the robot may cut through the adhesions to separate the two structures.

Embodiments of the present disclosure provide technical solutions to problems associated with quickly, accurately, and consistently verifying and/or measuring mechanical coupling between two anatomical elements, for example, between a part of a spine and a spinal nerve after a surgical procedure intended to release the nerve from the part of the spine (e.g., bone).

Figure 1:
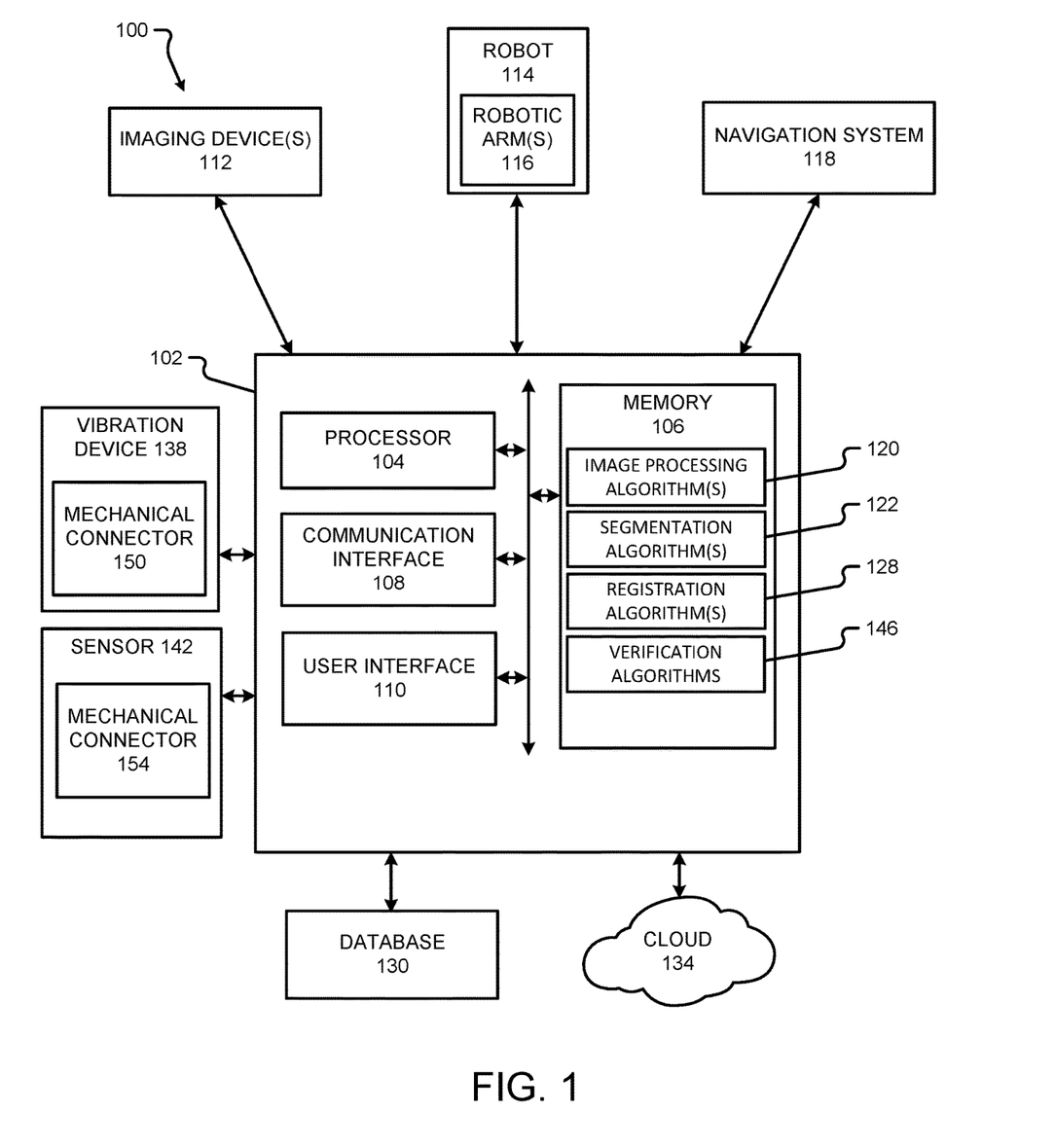
FIG. 1 is a block diagram of a system according to at least one embodiment of the present disclosure.

Turning first to FIG. 1, a block diagram of a system 100 according to at least one embodiment of the present disclosure is shown. The system 100 may be used to measure mechanically coupling between two anatomical elements to verify whether the two anatomical elements are mechanically coupled or not and/or to carry out one or more other aspects of one or more of the methods disclosed herein. The system 100 comprises a computing device 102, one or more imaging devices 112, a robot 114, a navigation system 118, a database 130, a cloud or other network 134, a vibration device 138, and/or a sensor 142. Systems according to other embodiments of the present disclosure may comprise more or fewer components than the system 100. For example, the system 100 may not include the imaging device 112, the robot 114, the navigation system 118, one or more components of the computing device 102, the database 130, and/or the cloud 134.

The computing device 102 comprises a processor 104, a memory 106, a communication interface 108, and a user interface 110. Computing devices according to other embodiments of the present disclosure may comprise more or fewer components than the computing device 102.

The processor 104 of the computing device 102 may be any processor described herein or any similar processor. The processor 104 may be configured to execute instructions stored in the memory 106, which instructions may cause the processor 104 to carry out one or more computing steps utilizing or based on data received from the imaging device 112, the robot 114, the navigation system 118, the database 130, and/or the cloud 134.

The memory 106 may be or comprise RAM, DRAM, SDRAM, other solid-state memory, any memory described herein, or any other tangible, non-transitory memory for storing computer-readable data and/or instructions. The memory 106 may store information or data useful for completing, for example, any step of the methods 200, 300, and/or 400 described herein, or of any other methods. The memory 106 may store, for example, one or more image processing algorithms 120, one or more segmentation algorithms 122, one or more registration algorithms 128, and/or one or more verification algorithms 146. Such instructions or algorithms may, in some embodiments, be organized into one or more applications, modules, packages, layers, or engines. The algorithms and/or instructions may cause the processor 104 to manipulate data stored in the memory 106 and/or received from or via the imaging device 112, the robot 114, the database 130, the cloud 134, and/or the sensor 142. In at least one example embodiment, the one or more verification algorithms 146 include algorithms to generate signals to cause the vibration device 138 to vibrate, algorithms to detect mechanical coupling between two or more anatomical elements based on vibration sensed by the sensor 142, algorithms to identify at least one attribute of the mechanical coupling based on vibration sensed by the sensor 142, and/or other suitable algorithms associated with detecting and/or altering the mechanical coupling of anatomical elements.

The computing device 102 may also comprise a communication interface 108. The communication interface 108 may be used for receiving data or information from an external source (such as the imaging device 112, the robot 114, the navigation system 118, the database 130, the cloud 134, the sensor 142, and/or any other system or component not part of the system 100), and/or for transmitting instructions, images, or other information to an external system or device (e.g., another computing device 102, the imaging device 112, the robot 114, the navigation system 118, the database 130, the cloud 134, the vibration device 138, and/or any other system or component not part of the system 100). The communication interface 108 may comprise one or more wired interfaces (e.g., a USB port, an ethernet port, a Firewire port) and/or one or more wireless transceivers or interfaces (configured, for example, to transmit and/or receive information via one or more wireless communication protocols such as 802.11a/b/g/n, Bluetooth, NFC, ZigBee, and so forth). In some embodiments, the communication interface 108 may be useful for enabling the device 102 to communicate with one or more other processors 104 or computing devices 102, whether to reduce the time needed to accomplish a computing-intensive task or for any other reason.

The computing device 102 may also comprise one or more user interfaces 110. The user interface 110 may be or comprise a keyboard, mouse, trackball, monitor, television, screen, touchscreen, and/or any other device for receiving information from a user and/or for providing information to a user. The user interface 110 may be used, for example, to receive a user selection or other user input regarding any step of any method described herein. Notwithstanding the foregoing, any required input for any step of any method described herein may be generated automatically by the system 100 (e.g., by the processor 104 or another component of the system 100) or received by the system 100 from a source external to the system 100. In some embodiments, the user interface 110 may be useful to allow a surgeon or other user to modify instructions to be executed by the processor 104 according to one or more embodiments of the present disclosure, and/or to modify or adjust a setting of other information displayed on the user interface 110 or corresponding thereto.

Although the user interface 110 is shown as part of the computing device 102, in some embodiments, the computing device 102 may utilize a user interface 110 that is housed separately from one or more remaining components of the computing device 102. In some embodiments, the user interface 110 may be located proximate one or more other components of the computing device 102, while in other embodiments, the user interface 110 may be located remotely from one or more other components of the computer device 102.

The imaging device 112 may be operable to image anatomical feature(s) (e.g., a bone, veins, tissue, etc.) and/or other aspects of patient anatomy to yield image data (e.g., image data depicting or corresponding to a bone, veins, tissue, etc.). "Image data" as used herein refers to the data generated or captured by an imaging device 112, including in a machine-readable form, a graphical/visual form, and in any other form. In various examples, the image data may comprise data corresponding to an anatomical feature of a patient, or to a portion thereof. The image data may be or comprise a preoperative image, an intraoperative image, a postoperative image, or an image taken independently of any surgical procedure. In some embodiments, a first imaging device 112 may be used to obtain first image data (e.g., a first image) at a first time, and a second imaging device 112 may be used to obtain second image data (e.g., a second image) at a second time after the first time. The imaging device 112 may be capable of taking a 2D image or a 3D image to yield the image data. The imaging device 112 may be or comprise, for example, an ultrasound scanner (which may comprise, for example, a physically separate transducer and receiver, or a single ultrasound transceiver), an O-arm, a C-arm, a G-arm, or any other device utilizing X-ray-based imaging (e.g., a fluoroscope, a CT scanner, or other X-ray machine), a magnetic resonance imaging (MM) scanner, an optical coherence tomography (OCT) scanner, an endoscope, a microscope, a thermographic camera (e.g., an infrared camera), a radar system (which may comprise, for example, a transmitter, a receiver, a processor, and one or more antennae), or any other imaging device 112 suitable for obtaining images of an anatomical feature of a patient. The imaging device 112 may be contained entirely within a single housing, or may comprise a transmitter/emitter and a receiver/detector that are in separate housings or are otherwise physically separated.

In some embodiments, the imaging device 112 may comprise more than one imaging device 112. For example, a first imaging device 112 may provide first image data and/or a first image, and a second imaging device 112 may provide second image data and/or a second image. In still other embodiments, the same imaging device may be used to provide both the first image data and the second image data, and/or any other image data described herein. The imaging device 112 may be operable to generate a stream of image data. For example, the imaging device 112 may be configured to operate with an open shutter, or with a shutter that continuously alternates between open and shut so as to capture successive images. For purposes of the present disclosure, unless specified otherwise, image data may be considered to be continuous and/or provided as an image data stream if the image data represents two or more frames per second.

The navigation system 118 may provide navigation for a surgeon and/or a surgical robot during an operation. The navigation system 118 may be any now-known or future-developed navigation system, including, for example, the Medtronic StealthStation™ S8 surgical navigation system or any successor thereof. The navigation system 118 may include one or more cameras or other sensor(s) for tracking one or more reference markers, navigated trackers, or other objects within the operating room or other room in which some or all of the system 100 is located. The one or more cameras may be optical cameras, infrared cameras, or other cameras. In some embodiments, the navigation system may comprise one or more electromagnetic sensors. In various embodiments, the navigation system 118 may be used to track a position and orientation (i.e., pose) of the imaging device 112, the robot 114 and/or robotic arm 116, and/or one or more surgical tools (or, more particularly, to track a pose of a navigated tracker attached, directly or indirectly, in fixed relation to the one or more of the foregoing). The navigation system 118 may include a display for displaying one or more images from an external source (e.g., the computing device 102, imaging device 112, or other source) or for displaying an image and/or video stream from the one or more cameras or other sensors of the navigation system 118. In some embodiments, the system 100 can operate without the use of the navigation system 118. The navigation system 118 may be configured to provide guidance to a surgeon or other user of the system 100 or a component thereof, to the robot 114, or to any other element of the system 100 regarding, for example, a pose of one or more anatomical elements, whether or not a tool is in the proper trajectory, and/or how to move a tool into the proper trajectory to carry out a surgical task according to a preoperative or other surgical plan.

The robot 114 may be any surgical robot or surgical robotic system. The robot 114 may be or comprise, for example, the Mazor X™ Stealth Edition robotic guidance system. The robot 114 may be configured to position the imaging device 112 at one or more precise position(s) and orientation(s), and/or to return the imaging device 112 to the same position(s) and orientation(s) at a later point in time. The robot 114 may additionally or alternatively be configured to manipulate a surgical tool (whether based on guidance from the navigation system 118 or not) to accomplish or to assist with a surgical task. In some embodiments, the robot 114 may be configured to hold and/or manipulate an anatomical element during or in connection with a surgical procedure. The robot 114 may comprise one or more robotic arms 116. In some embodiments, the robotic arm 116 may comprise a first robotic arm and a second robotic arm, though the robot 114 may comprise more than two robotic arms. In some embodiments, one or more of the robotic arms 116 may be used to hold and/or maneuver the imaging device 112. In embodiments where the imaging device 112 comprises two or more physically separate components (e.g., a transmitter and receiver), one robotic arm 116 may hold one such component, and another robotic arm 116 may hold another such component. Each robotic arm 116 may be positionable independently of the other robotic arm. The robotic arms may be controlled in a single, shared coordinate space, or in separate coordinate spaces.

The robot 114, together with the robotic arm 116, may have, for example, one, two, three, four, five, six, seven, or more degrees of freedom. Further, the robotic arm 116 may be positioned or positionable in any pose, plane, and/or focal point. The pose includes a position and an orientation. As a result, an imaging device 112, surgical tool, or other object held by the robot 114 (or, more specifically, by the robotic arm 116) may be precisely positionable in one or more needed and specific positions and orientations.

The robotic arm(s) 116 may comprise one or more sensors that enable the processor 104 (or a processor of the robot 114) to determine a precise pose in space of the robotic arm (as well as any object or element held by or secured to the robotic arm).

In some embodiments, reference markers (i.e., navigation markers) may be placed on the robot 114 (including, e.g., on the robotic arm 116), the imaging device 112, or any other object in the surgical space. The reference markers may be tracked by the navigation system 118, and the results of the tracking may be used by the robot 114 and/or by an operator of the system 100 or any component thereof. In some embodiments, the navigation system 118 can be used to track other components of the system (e.g., imaging device 112) and the system can operate without the use of the robot 114 (e.g., with the surgeon manually manipulating the imaging device 112 and/or one or more surgical tools, based on information and/or instructions generated by the navigation system 118, for example).

The vibration device 138 may include suitable hardware and/or software for providing vibration to an anatomical element or multiple anatomical elements, for example, in a human. The vibration device 138 may provide vibration at a selected frequency with a selected amplitude or selected frequencies with selected amplitudes. The vibration device 138 provides the vibration under control of the computing device 102 executing the verification algorithms 146 to verify mechanical coupling or mechanical de-coupling of at least two anatomical elements in addition to gathering additional information about the coupling state of the at least two anatomical elements. In at least one embodiment, the vibration device 138 is attached to a robotic arm 116 and controlled to move relative to a target anatomical element (e.g., to mount the vibration device 138 to the target anatomical element) by the robotic arm 116. However, example embodiments are not limited thereto, and the vibration device 138 may be partially or wholly manually manipulated by a surgeon, for example. In at least one example embodiment, the vibration device 138 provides vibration at frequencies lower than 40 kHz, or in one embodiment, at frequencies lower than those used for ultrasound elastography. However, example embodiments are not limited thereto and any suitable frequency or range of frequencies may be used. In one example, the vibration device 138 includes a transducer, such as a piezoelectric device, that converts electrical energy (i.e., electric current) into mechanical energy (i.e., vibration). However, example embodiments are not limited thereto, and other suitable devices for providing vibration at selected frequencies may be employed as the vibration device 138. The vibration device 138 may further include a mechanical connector 150 for holding the vibration device 138 in force-transmitting contact with an anatomical element. The mechanical connector 150 may include a clamp, a hook, a retractable hook (e.g., an L-hook), a bolt, a screw, a pin, wire, stitches, staples, or any other suitable connector for temporarily connecting the vibration device 138 to an anatomical element such as a nerve, bone, soft tissue, hard tissue, and the like. In other embodiments, the vibration device 138 may be secured in force-transmitting contact to the anatomical element using an adhesive or other non-mechanical connectors.

The sensor 142 may include suitable hardware and/or software for sensing vibration. For example, the sensor 142 may be or include an accelerometer, an optical sensor, a gyroscope, a strain gauge, a pressure sensor, an eddy-current sensor, a capacitive displacement sensor, a laser displacement sensor, a velocity sensor, a piezoelectric vibration sensor, and/or the like. In at least one example embodiment, the sensor 142 includes an IMU, where the IMU may include one or more of the above listed vibration sensors and/or other vibration sensor. The sensor 142 may be in force-receiving contact with an anatomical element. To this end, the sensor 142 may further include a mechanical connector 154. The mechanical connector 154 may include a clamp, a hook, a retractable hook (e.g., an L-hook), a bolt, a screw, a pin, wire, stitches, staples, or any other suitable connector for temporarily connecting the vibration device 142 to an anatomical element such as a nerve, bone, soft tissue, hard tissue, and the like.

In at least one embodiment, the mechanical connectors 150 and 154 are a same type of connector, such as a clamp. Each mechanical connector 150 and 154 may include more than one mechanism to achieve mechanical connection to a respective anatomical element. In addition, each mechanical connector 150 and 154 may be designed for connection to a respective anatomical element at a desired location on the anatomical element. The type of mechanical connector 150 and 154 and location of connection on an anatomical element may be a design parameter set based on empirical evidence.

In at least one embodiment, the mechanical connectors 150 and/or 154 are omitted from the system 100 or modified so that the vibration device 138 and/or the sensor 142 may be held in place (e.g., by robotic arm(s) 116) and in proximity to or in contact with a respective anatomical element without mechanical connection to the anatomical element other than surface contact with the anatomical element. To this end, an end of the vibration device 138 and/or an end of the sensor 142 may be modified to have a shape that conforms to or is otherwise designed for the portion of the anatomical element with which the end of the vibration device 138 and/or the end of the sensor 142 come into contact. For example, if the anatomical element has a convex curved surface, then the modified end of the vibration device 138 and/or the sensor 142 may include a concave shaped surface designed to fit the convex surface of the anatomical element to ensure proper surface contact to transmit or receive vibration.

The system 100 or similar systems may be used, for example, to carry out one or more aspects of any of the methods 200, 300, and/or 400 described herein. The system 100 or similar systems may also be used for other purposes.

Figure 2:
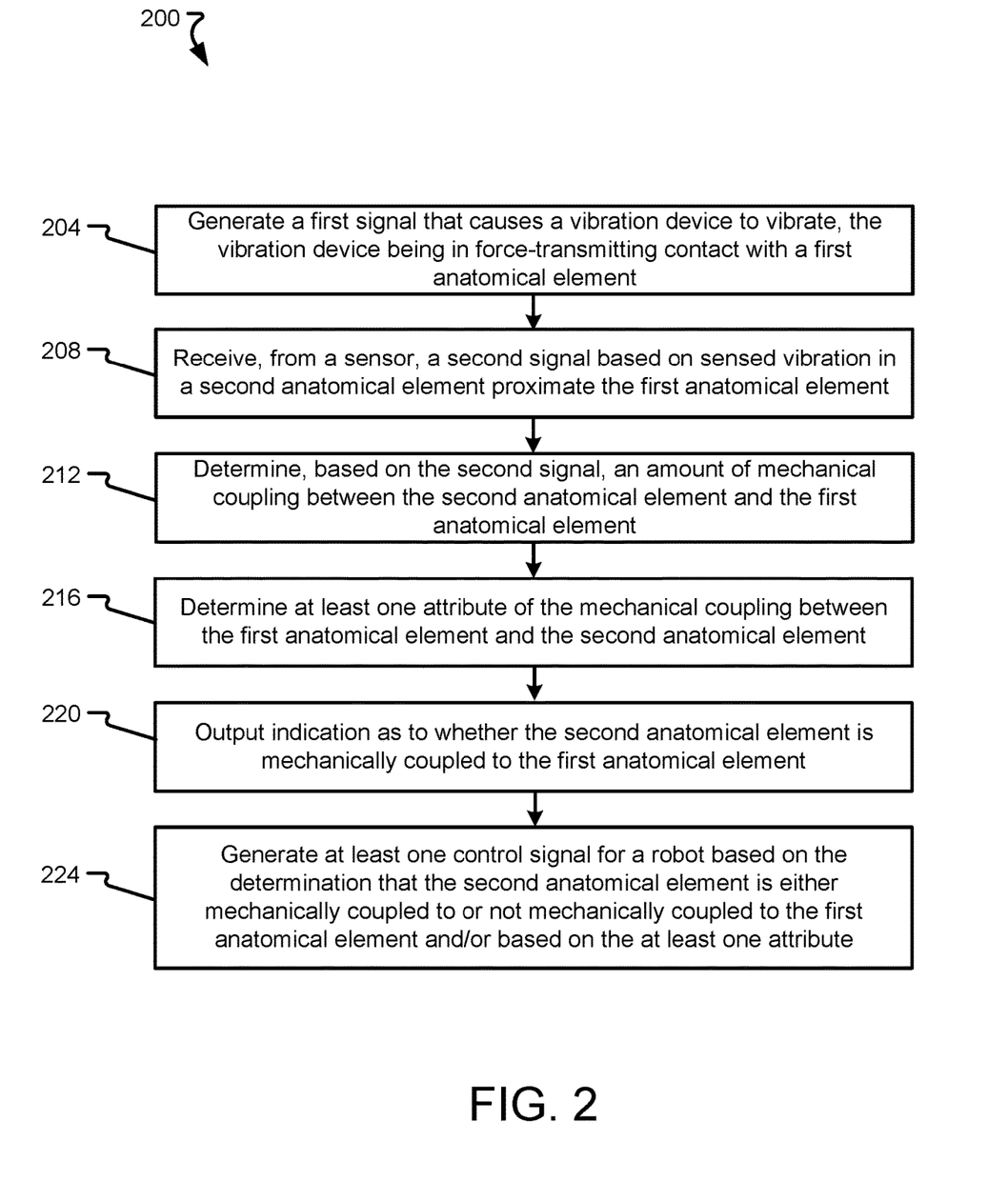
FIG. 2 is a flowchart according to at least one embodiment of the present disclosure.

FIG. 2 depicts a method 200 that may be used, for example, to determine whether two or more anatomical elements are mechanically coupled or bound to one another, and in at least one embodiment, to further determine at least one attribute of the mechanical coupling.

The method 200 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 200. The at least one processor may perform the method 200 by executing instructions stored in a memory such as the memory 106. The instructions may correspond to one or more steps of the method 200 described below. The instructions may cause the processor to execute one or more algorithms, such as an image processing algorithm 120, a segmentation algorithm 122, a registration algorithm 128, and/or a verification algorithm 146.

The method 200 comprises generating a first signal that causes a vibration device 138 to vibrate (step 204). The vibration device 138 is in force-transmitting contact with a first anatomical element. For example, the vibration device 138 is proximate to the first anatomical element. For example, the vibration device 138 may be placed within a few millimeters of the first anatomical element but not in physical contact with the first anatomical element (provided that forces generated by the vibration device 138 are still transmitted to the anatomical element), in surface contact with the first anatomical element, and/or temporarily connected to the first anatomical element with mechanical connector 150. The first signal may be an electrical signal that causes the vibration device 138 to produce mechanical vibrations at a first frequency with a first amplitude. In at least one example embodiment, the first signal is a composite signal with more than one frequency component, which may allow faster collection of information regarding the mechanical coupling between anatomical elements.

The method 200 also comprises receiving, from a sensor 142, a second signal based on sensed vibration in a second anatomical element proximate the first anatomical element (step 208). The second signal may be an electrical signal produced by the sensor 142 at a second frequency with a second amplitude in response to sensing vibrations. The second frequency and the second amplitude may be the same as or different than the first frequency and the first amplitude depending on a strength of the mechanical coupling and/or the presence of sources of vibration other than the vibration device 138. For example, the first frequency and the second frequency may be the same while the first amplitude and the second amplitude may be different. In at least one embodiment, for example, when the first signal is a composite signal, the second signal may also be a composite signal with more than one frequency component to allow faster collection of information regarding the mechanical coupling between anatomical elements. The sensor 142 may be in force-receiving contact with the second anatomical element. For example, the sensor 142 is proximate to the second anatomical element (i.e., not in physical contact with the second anatomical element, but still able to receive forces exerted on the second anatomical element), in surface contact with the second anatomical element, and/or temporarily connected to the second anatomical element with mechanical connector 154.

The first anatomical element and/or second anatomical element may include nerves, soft tissue, hard tissue, scar tissue, muscle, bone, and/or another part of an anatomy where knowledge about mechanical coupling between two anatomical elements is desired. For example, one of the first anatomical element or the second anatomical element may be or include bone, and the other one of the first anatomical element or the second anatomical element may be or include a nerve. However, the type of anatomical element that is coupled to the vibration device 138 and the type of anatomical element that is coupled to the sensor 142 may vary according to design preferences. When the method 200 is used for verifying nerve compression and/or decompression prior to or following spinal surgery, the first anatomical element may include a vertebra of the spine and the second anatomical element may include a spinal nerve normally intended to be free of the vertebra (e.g., not compressed by the vertebra). However, example embodiments are not limited thereto, and the first and second anatomical elements may include any two parts of the anatomy where knowledge of whether the anatomical elements are mechanically coupled to one another and/or knowledge of at least one attribute of the mechanical coupling is useful.

The method 200 also comprises determining, based on the second signal, an amount or degree of mechanical coupling between the second anatomical element and the first anatomical element (step 212). For example, as discussed with reference to FIG. 3, the amount of mechanical coupling may be determined using a difference between amplitudes of the first second and the second signal and a plurality of threshold differences. In at least one example embodiment, the method 200 may determine that the second anatomical element is either mechanically coupled to partially or not mechanically coupled to the first anatomical element. In any event, the frequency, amplitude, and/or phase of the second signal (or represented by the second signal) may be compared to the frequency, amplitude, and/or phase of the first signal generated in step 204 to draw conclusions about the mechanical coupling, if any, of the first anatomical element and the second anatomical element. Additionally or alternatively, the frequency, amplitude, and/or phase of the second signal (or represented by the second signal) may be compared to the frequency, amplitude, and/or phase of the vibration caused by the first signal to draw conclusions about the mechanical coupling, if any, of the first anatomical element and the second anatomical element. Such conclusions may include but are not limited to determining an amount of mechanical coupling between two anatomical elements, determining that the two anatomical elements are mechanically coupled or sufficiently coupled, are not mechanically coupled or too loosely coupled, and/or at least one attribute of the mechanical coupling (step 216). The at least one attribute of the mechanical coupling may identify or otherwise correspond to at least one type of anatomical tissue (e.g., connecting anatomical tissue) that forms the mechanical coupling and/or an amount of the mechanical coupling.

The at least one type of anatomical tissue may include one or more of soft tissue, hard tissue, scar tissue, fluid, muscle, or bone. The at least one type of anatomical tissue may be identifiable by analyzing characteristics of (or represented by) the second signal, such as amplitude, phase, and frequency compared to the same characteristics of the first signal or characteristics of the vibration caused by the first signal. In at least one example embodiment, the amplitude, phase, and frequency of the first signal is the same as the amplitude, phase, and frequency of the vibration caused by the first signal.

Each type of anatomical tissue may have a known effect on electrical and/or mechanical signals introduced thereto. Thus, the method 200 may analyze the second signal to identify types of anatomical tissue that make up parts of the first and second anatomical elements or that are positioned in a transmission path between the vibration device 138 and the sensor 142. For example, the method 200 determines a first type of the at least one type of anatomical tissue based on the amplitude, phase, and/or frequency of the first signal and the amplitude, phase, and/or frequency of the second signal. More specifically, each type of anatomical tissue may be known to attenuate amplitude and/or affect the phase of the second signal in a particular manner. For example, vibrations transmit through bone more easily than soft tissue. Thus, the method 200 may distinguish between bone and soft tissue by assigning amplitude thresholds to each item. In one example, if the amplitude of the second signal is within a first threshold amount of the amplitude of the vibration of the first anatomical element, then the method 200 may identify the anatomical tissue type as bone. If the amplitude of the second signal is outside of the first threshold amount but within a second threshold amount of the amplitude of the vibration introduced to the first anatomical element, the type of anatomical tissue may be soft tissue. Other amplitude difference and/or phase difference thresholds may exist for other types (or more specific subsets) of anatomical tissue (hard tissue, muscle, fluid, etc.).

The amount of mechanical coupling may be expressed as a number or other indicator (e.g., a scale of 1 to 10, a percentage, etc.) of how much coupling exists between the two anatomical elements. For example, the amplitude of the second signal compared to the amplitude of the first signal or the amplitude of the vibration caused by the first signal may be indicative of the amount of mechanical coupling. In a scenario where the first anatomical element and the second anatomical element include parts of a spine, the method 200 may determine an amount of spinal decompression based on the amount of the mechanical coupling. For example, the amount of mechanical coupling expressed as a number or other indicator may correlate with the amount of spinal decompression. In this case, a lower amount of mechanical coupling between a spinal nerve and a vertebra corresponds to a higher amount of spinal decompression. In other words, a higher amount of mechanical coupling corresponds to a higher amount of decompression to execute. After executing decompression operations, a lower amount of mechanical coupling corresponds to higher amount of decompression. Phase shift between the first signal (or vibration caused by the first signal) and the second signal may also be a useful indicator for determining the amount of mechanical coupling, in that two elements that are mechanically coupled may have a known phase shift upon introducing vibration to the first anatomical element and sensing vibration on the second anatomical element. For example, the phase shift between the applied vibration and the sensed vibration may be indicative of a distance between the first and second anatomical elements, and this distance may indicate a corresponding amount of mechanical coupling. Step 216 is described in more detail below with reference to FIG. 4.

The method 200 further comprises outputting an indication as to whether the second anatomical element is mechanically coupled to the first anatomical element (step 220). For example, the indication is an audio and/or visual indication from the user interface 110. In addition to indicating whether the two anatomical elements are mechanically coupled to one another, the indication may include other information such as the at least one attribute and/or amount of mechanical coupling mentioned above as well as, in some embodiments, instructions and/or other information useful to enable navigation of a surgical tool of the robot 114 or a surgeon to a location in the anatomy to alter the mechanical coupling. Step 220 may further include outputting an audio and/or visual indication of the at least one attribute determined in step 216. Steps 212 and 220 are described in more detail below with reference to FIG. 3.

The method 200 further comprises generating at least one control signal for a robot based on the determination that the second anatomical element is either mechanically coupled to or not mechanically coupled to the first anatomical element (step 224). For example, step 224 generates the at least one control signal for robot 114.

The at least one control signal may cause the robot 114 to alter a characteristic or characteristics of the mechanical coupling. For example, the at least one control signal causes the robot 114 to alter a state of the mechanical coupling to be closer to an intended state of the mechanical coupling or target amount of mechanical coupling, which may include controlling a robot 114 to alter the amount of the mechanical coupling based on to a target amount of mechanical coupling between the first anatomical element and the second anatomical element. That is, if the first and second anatomical elements are intended to not be mechanically coupled or are intended to be loosely coupled but the method 200 has determined that the two anatomical elements are too tightly coupled, then the at least one control signal may cause the robot 114 to navigate to the area of the anatomy with the anatomical elements and perform one or more operations to loosen or eliminate the mechanical coupling (e.g., with a surgical tool). On the other hand, if the first and second anatomical elements are intended to be mechanically coupled but the method 200 has determined that the two anatomical elements are not mechanically coupled or are too loosely coupled, then the at least one control signal may cause the robot 114 to navigate to the area of the anatomy with the anatomical elements and perform one or more operations to create or strengthen the mechanical coupling. In at least one embodiment, the at least one control signal causes the robot 114 to perform other operations not having a direct effect on the state of mechanical coupling, such as causing the robot 114 to capture still and/or moving images of the anatomy (e.g., with an imaging device such as an imaging device 112) or perform other operations generally performed for the surgical procedure at issue.

The present disclosure encompasses embodiments of the method 200 that comprise more or fewer steps than those described above, and/or one or more steps that are different than the steps described above. For example, it should be appreciated that steps 216, 220, and 224 are optional steps that may be omitted from the method 200 if desired.

Figure 3:
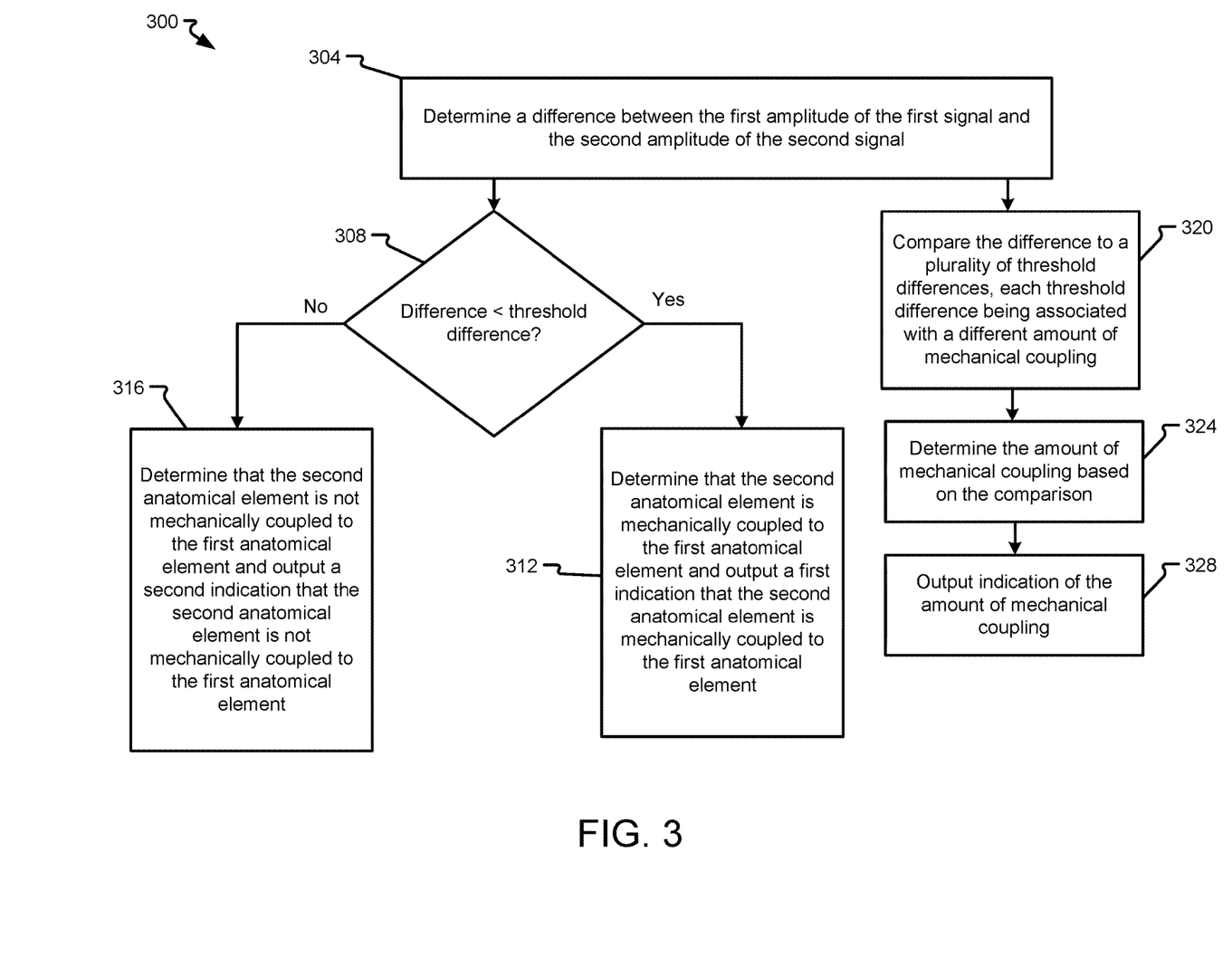
FIG. 3 is a flowchart according to at least one embodiment of the present disclosure.

FIG. 3 depicts a method 300 that illustrates steps 212 and 216 from FIG. 2 in additional detail.

The method 300 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 300. The at least one processor may perform the method 300 by executing instructions stored in a memory such as the memory 106. The instructions may correspond to one or more steps of the method 300 described below. The instructions may cause the processor to execute one or more algorithms, such as an image processing algorithm 120, a segmentation algorithm 122, a registration algorithm 128, and/or a verification algorithm 146.

The method 300 comprises determining a difference between the first amplitude of the first signal and the second amplitude of the second signal (step 304). For example, the second amplitude is subtracted from the first amplitude to determine the difference. The step 304 may comprise processing one or both of the first signal and/or the second signal to ensure that both signals represent the same thing (e.g., vibrations), such that the signals may be compared as described herein. In at least one example embodiment, the first amplitude of the first signal and/or the second amplitude of the second signal may be weighted in accordance with known features of the first anatomical element and/or the second anatomical element. For example, if internal conditions of the anatomy and/or conditions external to the anatomy are known to affect or otherwise interfere with (e.g., enhance or diminish) the amplitude, frequency, and/or phase of the first signal and/or the amplitude, frequency, and/or phase of the second signal in a particular manner, then these characteristics of the first signal and/or the second signal may be weighted to account for the interference. Thus, any weighting applied to the first signal and/or the second signal is a design parameter set based on empirical evidence and/or preference. As explained below, the method 300 includes determining whether the second anatomical element is mechanically coupled to the first anatomical element based on the difference determined in step 304.

For example, the method 300 comprises comparing the difference from step 304 to a threshold difference (e.g., a threshold amplitude difference) to determine whether the difference is below the threshold difference (step 308). The threshold difference is a design parameter set based on empirical evidence and/or preference. The amplitude of the second signal may be attenuated by the first anatomical element, the second anatomical element, and/or any intervening or connecting anatomic material (tissue, fluid, etc.). Accordingly, the amplitude of the second signal may be closer to the amplitude of the first signal in cases where the first and second anatomical elements are mechanically coupled or closely coupled than in cases where the first and second anatomical elements are not mechanically coupled or are loosely coupled.

Thus, when the difference is below the threshold difference, the method 300 includes determining that the second anatomical element is mechanically coupled to the first anatomical element and outputting a first indication that the second anatomical element is mechanically coupled to the first anatomical element (step 312).

However, when the difference is at or above the threshold difference, the method 300 includes determining that the second anatomical element is not mechanically coupled to the first anatomical element and outputting a second indication that the second anatomical element is not mechanically coupled to the first anatomical element (step 316). As noted above in step 216, the first and second indications may be audio and/or visual indications on the user interface 110.

The method 300 may additionally or alternatively include steps 320, 324, and 328.

For example, the method 300 may include comparing the difference determined in step 304 to a plurality of threshold differences, for example, a plurality of amplitude threshold differences (step 320). Each threshold difference may be associated with a different amount of mechanical coupling between the first anatomical element and the second anatomical element. Each threshold difference may be separated from a next threshold difference by a desired amount. The amount between each threshold difference may be uniform across all thresholds or differ between one or more thresholds. The threshold differences and the amount between each threshold may be a design parameter set based on empirical evidence and/or preference.

The method 300 may further include determining the amount of mechanical coupling based on the comparison of the difference to the plurality of threshold differences (step 324). For example, if the difference from step 304 falls above a first threshold difference but below a second threshold difference, then the method 300 may determine that the amount of mechanical coupling corresponds to the amount associated with the first threshold difference. As noted above, the amount of mechanical coupling may be expressed as a number or other indicator (e.g., a scale of 1 to 10, a percentage, etc.) of how much coupling exists between two anatomical elements.

The method 300 may further include outputting an indication of the amount of mechanical coupling to a user interface 110 (step 328).

Although FIG. 3 illustrates steps 308, 312, and 316 as being performed separately from steps 320, 324, and 328, it should be appreciated that the binary determination of whether the first and second anatomical elements are mechanically coupled or not in steps 312 and 316 may be derived from the amount of mechanical coupling determined in step 324. In other words, the amount of mechanical coupling determined in step 324 may be compared to a threshold amount that enables the method 300 to output make the binary determination of whether anatomical elements are either mechanically coupled or not mechanically coupled. For example, if the amount of mechanical coupling determined in step 324 is below the threshold amount, then the method 300 makes the determination in step 316, while if the amount of mechanical coupling is at or above the threshold amount, the method 300 makes the determination in step 312.

FIG. 3 relates to determining a difference between amplitudes of the first and second signals to draw conclusions about the mechanical coupling between two anatomical elements based on threshold amplitude differences. However, example embodiments are not limited thereto, and the method 300 may be carried out for a phase shift and/or frequency change that occurs between the first signal and the second signal. In this case, the method 300 determines a phase difference and/or a frequency difference between the first and second signals to draw conclusions about the mechanical coupling between two anatomical elements using thresholds associated with the phase difference and/or the frequency difference. In a spinal decompression example, the phase shift response may be at or near the excitation frequency when the compression is tight, as the viscoelastic nature of involved tissue behaves as a first order system. Once decompression progresses, additional frequencies may arise.

The present disclosure encompasses embodiments of the method 300 that comprise more or fewer steps than those described above, and/or one or more steps that are different than the steps described above.

Figure 4:
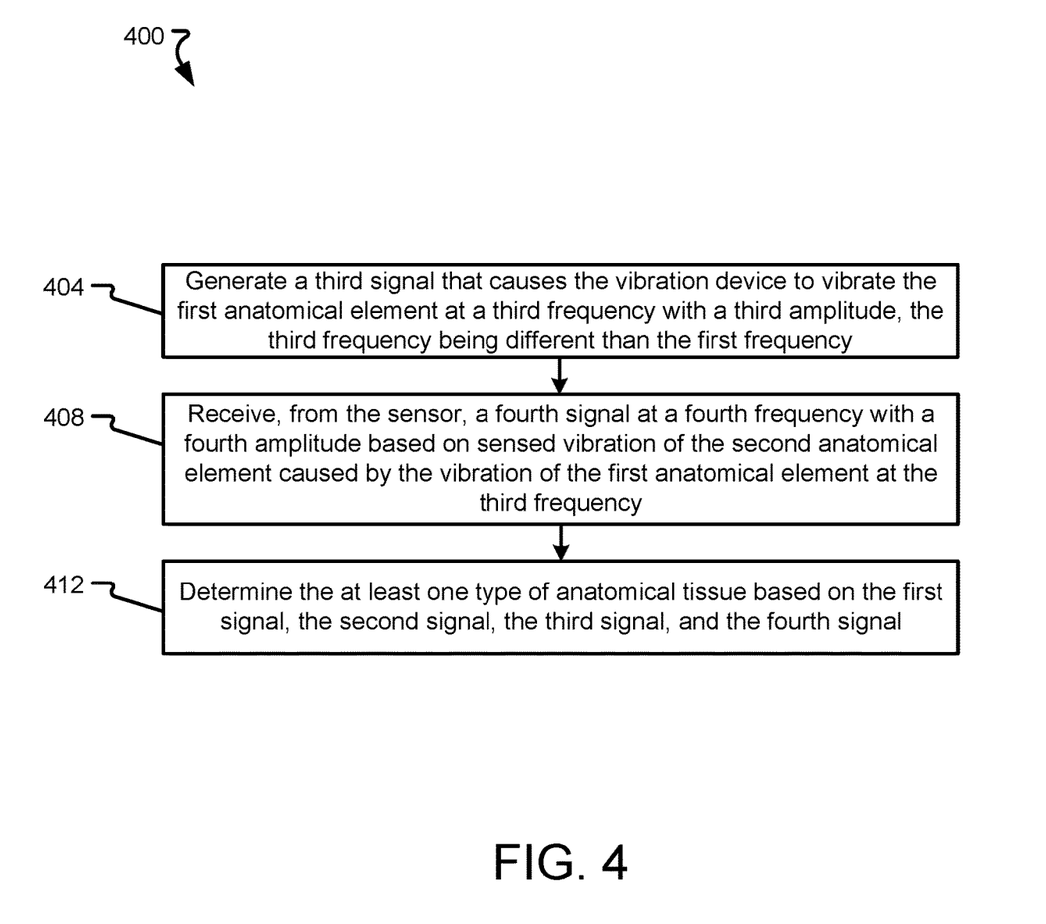
FIG. 4 is a flowchart according to at least one embodiment of the present disclosure.

FIG. 4 depicts a method 400 that illustrates step 216 from FIG. 2 in additional detail. For example, FIG. 4 illustrates additional steps for identifying anatomical tissue types that form part of the mechanical coupling or that intervene in the mechanical coupling between the first anatomical element and the second anatomical element.

The method 400 (and/or one or more steps thereof) may be carried out or otherwise performed, for example, by at least one processor. The at least one processor may be the same as or similar to the processor(s) 104 of the computing device 102 described above. The at least one processor may be part of a robot (such as a robot 114) or part of a navigation system (such as a navigation system 118). A processor other than any processor described herein may also be used to execute the method 400. The at least one processor may perform the method 400 by executing instructions stored in a memory such as the memory 106. The instructions may correspond to one or more steps of the method 400 described below. The instructions may cause the processor to execute one or more algorithms, such as an image processing algorithm 120, a segmentation algorithm 122, a registration algorithm 128, and/or a verification algorithm 146.

As noted above in step 216, the at least one attribute of the mechanical coupling may identify at least one type of anatomical tissue type that forms the mechanical coupling and/or an amount of the mechanical coupling. The at least one type of anatomical tissue may include one or more of soft tissue, hard tissue, scar tissue, fluid, muscle, or bone, and the amount of mechanical coupling may be expressed as a number or other indicator (e.g., a scale of 1 to 10, a percentage, etc.) of how much coupling exists between the two anatomical elements. As also noted above, example embodiments may determine the at least one type of anatomical tissue based on the first signal and the second signal (e.g., using amplitudes and/or phase shift). However, it should be appreciated that different types of anatomical tissue respond differently to vibration. Thus, other types of anatomical tissue may be identified by vibrating the vibration device 138 at different frequencies, amplitudes, and/or phases.

Accordingly, the method 400 includes generating a third signal that causes the vibration device 138 to vibrate the first anatomical element at a third frequency with a third amplitude, where the third frequency is different than the first frequency of the first signal (step 404).

The method 400 further comprises receiving, from the sensor 142, a fourth signal at a fourth frequency with a fourth amplitude based on sensed vibration of the second anatomical element caused by the vibration of the first anatomical element at the third frequency (step 408).

The method 400 further comprises determining the at least one type of anatomical tissue based on the first signal, the second signal, the third signal, and the fourth signal (step 412). For example, the method 400 determines a first type of the at least one type of anatomical tissue based on the first signal and the second signal and determines a second type of the at least one type of anatomical tissue different than the first type based on the third signal and the fourth signal. The first type and the second type of the anatomical tissue may be different from one another. For example, one type may be bone and the other type may be fluid. As noted above, amplitudes, phases, and/or frequencies of the first through fourth signals may be analyzed to assist with identifying the first and second types of anatomical tissue.

The present disclosure encompasses embodiments of the method 400 that comprise more or fewer steps than those described above, and/or one or more steps that are different than the steps described above.

Example embodiments have been shown and described with respect to checking mechanical coupling between two anatomical elements. However, it should be appreciated that the example embodiments provide for checking the mechanical coupling between more than two anatomical elements by including multiple vibration devices 138 and/or sensors 142 and/or by attaching a single vibration device 138 and/or a single sensor 142 to multiple anatomical elements.

As noted above, the present disclosure encompasses methods with fewer than all of the steps identified in FIGS. 2, 3, and 4 (and the corresponding description of the methods 200, 300, and 400), as well as methods that include additional steps beyond those identified in FIGS. 2, 3, and 4 (and the corresponding description of the methods 200, 300, and 400). The present disclosure also encompasses methods that comprise one or more steps from one method described herein, and one or more steps from another method described herein. Any correlation described herein may be or comprise a registration or any other correlation.

Example embodiments have been shown and described with respect to determining an amount of mechanical coupling between two anatomical elements based on induced and sensed vibrations. However, inventive concepts also provide for determining an amount of mechanical coupling between two elements based on a force applied to a first anatomical element that induces a resulting force on a second anatomical element with some amount of mechanical coupling to the first anatomical element. Stated another way, an amount of mechanical coupling may be determined by applying a (constant) displacement to one anatomical element and then measuring the (constant) resulting displacement on another anatomical element. A difference between the applied displacement and the measured displacement is indicative of the amount of mechanical coupling. The force applied to the first anatomical element may be applied by any suitable device (e.g., a robotically controlled surgical instrument) and may take any suitable form, such as a translational force, shearing force, rotational force, and/or the like. Meanwhile, the resulting force induced to the second anatomical element may be sensed by any sensor suitable for sensing displacement (e.g., a strain gauge sensor, a tracking device such as one comprised of an optical sensor and a light source, and/or the like) and may take any suitable form, such as a translational force, shearing force, rotational force, and/or the like. In at least one embodiment, displacement between two anatomical elements may be induced and sensed by a single device that applies the force and also senses the displacement. The amount of mechanical coupling between anatomical elements based on applied and sensed displacements may be quantified in the same or similar fashion as that described above for the applied and sensed vibrations.

The foregoing is not intended to limit the disclosure to the form or forms disclosed herein. In the foregoing Detailed Description, for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the foregoing has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

It should be appreciated that inventive concepts cover any embodiment in combination with any one or more other embodiment, any one or more of the features disclosed herein, any one or more of the features as substantially disclosed herein, any one or more of the features as substantially disclosed herein in combination with any one or more other features as substantially disclosed herein, any one of the aspects/features/embodiments in combination with any one or more other aspects/features/embodiments, use of any one or more of the embodiments or features as disclosed herein. It is to be appreciated that any feature described herein can be claimed in combination with any other feature(s) as described herein, regardless of whether the features come from the same described embodiment.

What is claimed is:

1. A device comprising:
   at least one processor; and
   a memory comprising instructions that when executed by the at least one processor cause the at least one processor to:
   generate a first signal that causes a vibration device to vibrate, the vibration device being in force-transmitting contact with a first anatomical element;
   receive, from a sensor, a second signal based on vibration of a second anatomical element caused at least in part by the first anatomical element vibrating in accordance with the first signal;
   determine, based on the second signal, an amount of mechanical coupling between the second anatomical element and the first anatomical element; and
   generate at least one control signal for controlling a robot to perform an operation based on the amount of mechanical coupling.

2. The device of claim 1, wherein the first signal causes the vibration device to vibrate at a first amplitude, and wherein the second signal is generated at a second amplitude by vibration of the second anatomical element.

3. The device of claim 2, wherein the at least one processor determines the amount of mechanical coupling by:
   determining a difference between the first amplitude and the second amplitude; and
   determining the amount of mechanical coupling based on the difference.

4. The device of claim 3, wherein the instructions include instructions that cause the at least one processor to:
   compare the difference to a plurality of threshold differences; and
   determine the amount of mechanical coupling based on the comparison of the difference to the plurality of threshold differences, each threshold difference being associated with a different amount of mechanical coupling between the first anatomical element and the second anatomical element; and
   output an indication of the amount of mechanical coupling to a user interface.

5. The device of claim 3, wherein the instructions include instructions that cause the at least one processor to:
   determine that the second anatomical element is mechanically coupled to the first anatomical element and output a first indication to a user interface that the second anatomical element is mechanically coupled to the first anatomical element when the amount of mechanical coupling is at or above a threshold amount; and determine that the second anatomical element is not mechanically coupled to the first anatomical element and output a second indication to the user interface that the second anatomical element is not mechanically coupled to the first anatomical element when the amount of mechanical coupling is below the threshold amount.

6. The device of claim 2, wherein the instructions include instructions that cause the at least one processor to determine at least one attribute of the mechanical coupling between the first anatomical element and the second anatomical element.

7. The device of claim 6, wherein the at least one attribute of the mechanical coupling identifies at least one type of connecting anatomical tissue type that forms the mechanical coupling.

8. The device of claim 7, wherein the instructions include instructions that cause the at least one processor to determine the at least one type of connecting anatomical tissue based on the first signal and the second signal.

9. The device of claim 8, wherein the first signal has a first frequency and the second signal has a second frequency, and wherein the instructions include instructions that cause the at least one processor to:

generate a third signal that causes the vibration device to vibrate the first anatomical element at a third frequency with a third amplitude, the third frequency being different than the first frequency;

receive, from the sensor, a fourth signal at a fourth frequency with a fourth amplitude based on sensed vibration of the second anatomical element caused by the vibration of the first anatomical element at the third frequency; and determine the at least one type of connecting anatomical tissue based on the first signal, the second signal, the third signal, and the fourth signal.

10. The device of claim 9, wherein the at least one processor:

determines a first type of the at least one type of connecting anatomical tissue based on the first signal and the second signal; and determines a second type of the at least one type of connecting anatomical tissue different than the first type based on the third signal and the fourth signal.

11. The device of claim 9, wherein the at least one type of connecting anatomical tissue includes one or more of soft tissue, hard tissue, scar tissue, fluid, muscle, or bone.

12. The device of claim 1, wherein the amount of mechanical coupling indicates that the second anatomical element is either mechanically coupled to or not mechanically coupled to the first anatomical element.

13. A system, comprising:
a vibration device configured to provide vibration;
a sensor configured to sense vibration;
at least one processor; and
a memory comprising instructions that when executed by the at least one processor cause the at least one processor to:

generate a first signal that causes the vibration device to vibrate, the vibration device being in force-transmitting contact with a first anatomical element;

receive, from the sensor, a second signal based on vibration of a second anatomical element caused at least in part by the first anatomical element vibrating in accordance with the first signal; and determine, based on the second signal, an amount of mechanical coupling between the second anatomical element and the first anatomical element; and a robot configured to alter the amount of mechanical coupling to bring the amount of mechanical coupling closer to a target amount.

14. The system of claim 13, wherein the vibration device is configured to be mechanically connected to the first anatomical element.

15. The system of claim 14, wherein the sensor is configured to be mechanically connected to the second anatomical element.

16. The system of claim 15, wherein one of the first anatomical element or the second anatomical element includes bone, and wherein the other one of the first anatomical element or the second anatomical element includes a nerve.

17. The system of claim 16, wherein the bone includes bone of a vertebra and the nerve includes a spinal nerve.

18. The system of claim 13, wherein the first anatomical element and the second anatomical element include parts of a spine, and wherein the at least one processor determines an amount of spinal decompression based on the amount of mechanical coupling.

19. The system of claim 18, wherein the target amount is a target for the amount of spinal decompression.

20. A method, comprising:
generating a first signal that causes a vibration device to vibrate, the vibration device being in force-transmitting contact with a first anatomical element;

receiving, from a sensor, a second signal based on vibration of a second anatomical element caused at least in part by the first anatomical element vibrating in accordance with the first signal;

determining an amount of mechanical coupling between the first anatomical element and the second anatomical element based on the second signal; and controlling a robot to alter the amount of mechanical coupling based on a target amount of mechanical coupling between the first anatomical element and the second anatomical element.

* * * * *